(12) United States Patent
Chinavare

(10) Patent No.: US 11,559,812 B2
(45) Date of Patent: Jan. 24, 2023

(54) APPARATUS FOR MULTI-SPECIMEN TEST INSTRUMENT

(71) Applicant: TA Instruments-Waters LLC, New Castle, DE (US)

(72) Inventor: Jason L. Chinavare, Minnetonka, MN (US)

(73) Assignee: TA INSTRUMENTS-WATERS LLC, New Castle, DE (US)

(*) Notice: Subject to any disclaimer, the term of this patent is extended or adjusted under 35 U.S.C. 154(b) by 382 days.

(21) Appl. No.: 16/713,176

(22) Filed: Dec. 13, 2019

(65) Prior Publication Data

US 2020/0238290 A1 Jul. 30, 2020

Related U.S. Application Data

(60) Provisional application No. 62/798,134, filed on Jan. 29, 2019.

(51) Int. Cl.
| | | |
|---|---|---|
| *B01L 9/00* | (2006.01) | |
| *B01L 7/02* | (2006.01) | |
| *G05D 9/12* | (2006.01) | |
| *F16K 31/18* | (2006.01) | |

(52) U.S. Cl.
CPC ............ *B01L 7/02* (2013.01); *G05D 9/12* (2013.01); *B01L 2300/0861* (2013.01); *B01L 2300/18* (2013.01); *F16K 31/18* (2013.01)

(58) Field of Classification Search
CPC .......................... B01L 7/02; B01L 2300/0861
USPC ................................................. 422/560, 566
See application file for complete search history.

(56) References Cited

U.S. PATENT DOCUMENTS

| | | |
|---|---|---|
| 2003/0033896 A1 | 2/2003 | Borowczak et al. |
| 2012/0221252 A1* | 8/2012 | Heinz ................ G01N 21/6428 |
| | | 702/19 |

FOREIGN PATENT DOCUMENTS

| | | |
|---|---|---|
| CN | 108072567 A | 5/2018 |
| WO | 2017202396 A1 | 11/2017 |

OTHER PUBLICATIONS

"Electroforce® Cardiovascular Test Instruments" Brochure, TA Instruments, 2017.
"ElectroForce® Multi-specimen Fatique Test Instruments," TA Instruments, 2015.
Extended Search Report in European patent application No. 20154237.0 dated Oct. 7, 2020.

* cited by examiner

*Primary Examiner* — Natalia Levkovich
(74) *Attorney, Agent, or Firm* — Schmeiser, Olsen & Watts LLP; William G. Guerin

(57) ABSTRACT

Described are a test device, a multi-specimen test fixture star and a multi-specimen test fixture. The test device includes a bath chamber that is automatically replenished with bath liquid throughout an extended test period. The multi-specimen test fixture star is non-circularly symmetric and can be used, for example, in a rectangular bath chamber to hold a greater number of test specimens than a circularly symmetric test fixture star. The multi-specimen test fixture includes, in part, a multi-specimen test fixture star and a shaft having one or more keyways and enables the test fixture star to be repositioned along the shaft without loss of rotational alignment to the shaft.

11 Claims, 9 Drawing Sheets

APPARATUS FOR MULTI-SPECIMEN TEST INSTRUMENT

RELATED APPLICATION

This application claims the benefit of the earlier filing date of U.S. provisional patent application No. 62/798,134, filed Jan. 29, 2019 and titled "Apparatus for Multi-Specimen Test Instrument," the entirety of which is incorporated herein by reference.

FIELD OF THE INVENTION

The technology generally relates to test instruments for mechanical characterization and fatigue testing. More particularly, the technology relates to apparatus that include multi-specimen test fixtures, bath chamber liquid level maintenance and temperature control, and instrument adjustment for specimen length variations for such test instruments.

BACKGROUND

During mechanical testing, specimens are often immersed in a liquid bath such as a saline bath. Test durations may extend from less than a day to several weeks or more. The liquid may evaporate during testing, consequently, test personnel may repeatedly add liquid to the bath to ensure the specimens remain immersed throughout the duration of the test. The temperature of the bath liquid and the temperature of the added liquid may be different. If the temperature difference is substantial and if the volume of added liquid is significant relative to the bath volume, the bath temperature can change significantly during liquid replenishment. As a result, the temperature of the specimens can change significantly. Additionally, the process of adding liquid to the bath introduces a risk of spillage and the movement of liquid in the bath resulting from adding the liquid may damage the specimens.

The specimens may be held in a multi-specimen fixture (MSF). Typically, the MSF has a radially symmetric configuration. Advantageously, the radially symmetric configuration has uniform deformation at each specimen site under application of a load; however, increasing the size of the specimens and/or increasing the number of specimens results in a large increase in the fixture size. In some instances, the increase may be limited by the available space of the test system. In addition, one or more specimens may be visually obscured due to the circular MSF geometry and components of the test system.

A user may want to test different lengths of specimens for different test procedures. Individual tests are configured for multiple specimens each at the same length. To change to specimens of a different length for a different test, significant time may be required (e.g., several hours or more) due to specimen alignment requirements and partial disassembly and reassembly of the test instrument.

SUMMARY

In one aspect, a test chamber device includes a bath chamber, a supply reservoir, a fluid channel, a liquid level sensor and a valve. The bath chamber is configured to receive one or more test specimens and to hold a first volume of a liquid. The supply reservoir holds a second volume of the liquid. The fluid channel fluidically couples the bath chamber and the supply reservoir. The liquid level sensor is disposed at one of the bath chamber and the supply reservoir and is configured to sense a liquid level. The valve is configured to fluidically couple a source of the liquid to the supply reservoir and is responsive to a sensed liquid level as determined by the liquid level sensor. The valve dispenses a volume of the liquid from the source of the liquid into the supply reservoir when the liquid level decreases to a threshold liquid level.

The liquid level sensor and the valve may be a float valve. The liquid level sensor may include at least one of an optical sensor, an electro-mechanical switch and an electrical sensor. The liquid may be a saline solution. The valve may include at least one of a pneumatic actuator, a hydraulic actuator and an electrical actuator.

The bath chamber may include a heating surface. The bath chamber may include a wall where one end of the fluid channel is disposed at the wall and is proximate to the heating surface.

The supply reservoir may be disposed adjacent to the bath chamber and the fluid channel may include an opening through a wall separating the first volume of the liquid from the second volume of the liquid. Alternatively, the fluid channel may include a tube extending from the supply reservoir to the bath chamber.

In another aspect, a multi-specimen test fixture star includes a plurality of fixture arms and a plurality of cross-members. Each fixture arm extends radially from a fixture center and has an arm end with a specimen attachment location. Each cross-member has a first end at a fixture arm at a position between the fixture center and the arm end and has a second end at an adjacent one of the fixture arms at a position between the fixture center and the arm end. The specimen attachment locations define a rectangular shape centered on the fixture center. A load applied by a shaft coupled to the fixture arms at the fixture center is equally distributed to the specimen attachment locations.

The fixture arms may extend radially from an axial fixture opening at the fixture center and the multi-specimen test fixture star may further include a fixture hub configured for coupling the multi-specimen test fixture star to the shaft and disposed at the axial opening.

A cross-section of each of the fixture arms may be selected to achieve a displacement at the specimen attachment location that is substantially equal to the displacement at each of the other specimen attachment locations. A cross-section of each of the cross-members may be selected to achieve a displacement at the specimen attachment location that is substantially equal to the displacement at each of the other specimen attachment locations.

At least one of a width, a length and a thickness of at least one fixture arm may be different than at least one of the width, the length and the thickness of at least one other fixture arm. At least one of a width, a length and a thickness of at least one cross-member may be different than at least one of the width, the length and the thickness of at least one other cross-member.

A width, a length and a thickness of each fixture arm is the same as the width, the length and the thickness of a diametrically-opposed fixture arm. A width, a length and a thickness of each cross-member is the same as the width, the length and the thickness of a diametrically-opposed cross-member.

The rectangular array may be a square array.

The specimen attachment locations may be first specimen attachment locations and the multi-specimen test fixture star may further include a plurality of second specimen attachment locations each disposed along a length of one of the fixture arms between the arm end and the fixture hub such that the load applied by the central shaft is equally distributed to the first and second specimen attachment locations. The second specimen attachment locations may define a rectangular array centered on the fixture center.

In still another aspect, a multi-specimen test fixture includes a shaft, a multi-specimen test fixture star, a locking collar and a clamp. The shaft has a shaft axis and a cylindrical surface with a keyway formed in the cylindrical surface. The multi-specimen test fixture star has an axial fixture opening at a fixture center and has a plurality of fixture arms. Each fixture arm has an arm end and extending radially from the axial opening and each fixture arm has a specimen attachment location. The locking collar is in engagement with the multi-specimen test fixture star and has an axial collar opening to pass the shaft. The locking collar has a cylindrical inner surface that is parallel to the cylindrical surface of the shaft and the locking collar has a key member extending from the cylindrical inner surface into the keyway such that the multi-specimen test fixture star is prevented from rotating about the shaft axis. The clamp secures the locking collar to the shaft. The multi-specimen test fixture star is adjustable in position along a length of the shaft according to a position of the locking collar on the shaft and a load applied along the axis of the shaft is equally distributed to the specimen attachment locations.

The locking collar and the clamp are formed as a unitary component.

The keyway may include a slot having a length that is parallel to the shaft axis. The slot may have a rectangular cross-section or may be a V-shaped slot.

The key member may include a spherical surface. The key member may be a spring-loaded member.

BRIEF DESCRIPTION OF THE DRAWINGS

The above and further advantages of this invention may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. For clarity, not every element may be labeled in every figure. The drawings are not necessarily to scale, emphasis instead being placed upon illustrating the principles of the invention.

DETAILED DESCRIPTION

Reference in the specification to "one example" or "an example" means that a particular feature, structure or characteristic described in connection with the example is included in at least one example of the teaching. References to a particular example within the specification do not necessarily all refer to the same example.

In brief overview, examples disclosed herein are directed to a test device, a multi-specimen test fixture star and a multi-specimen test fixture. The test device includes a bath chamber that is automatically replenished with bath liquid throughout an extended test period. The multi-specimen test fixture star is non-circularly symmetric and can be used, for example, in a rectangular bath chamber to hold a greater number of test specimens than a circularly symmetric test fixture star. The multi-specimen test fixture includes, in part, a multi-specimen test fixture star and a shaft having one or more keyways and allows the test fixture star to be repositioned along the shaft without loss of rotational alignment of the star to the shaft.

The present teaching will now be described in more detail with reference to examples shown in the accompanying drawings. While the present teaching is described in conjunction with various examples, it is not intended that the present teaching be limited to such examples. On the contrary, the present teaching encompasses various alternatives, modifications and equivalents, as will be appreciated by those of skill in the art. Those of ordinary skill having access to the teaching herein will recognize additional implementations, modifications and examples, as well as other fields of use, which are within the scope of the present disclosure.

Figure 1A:
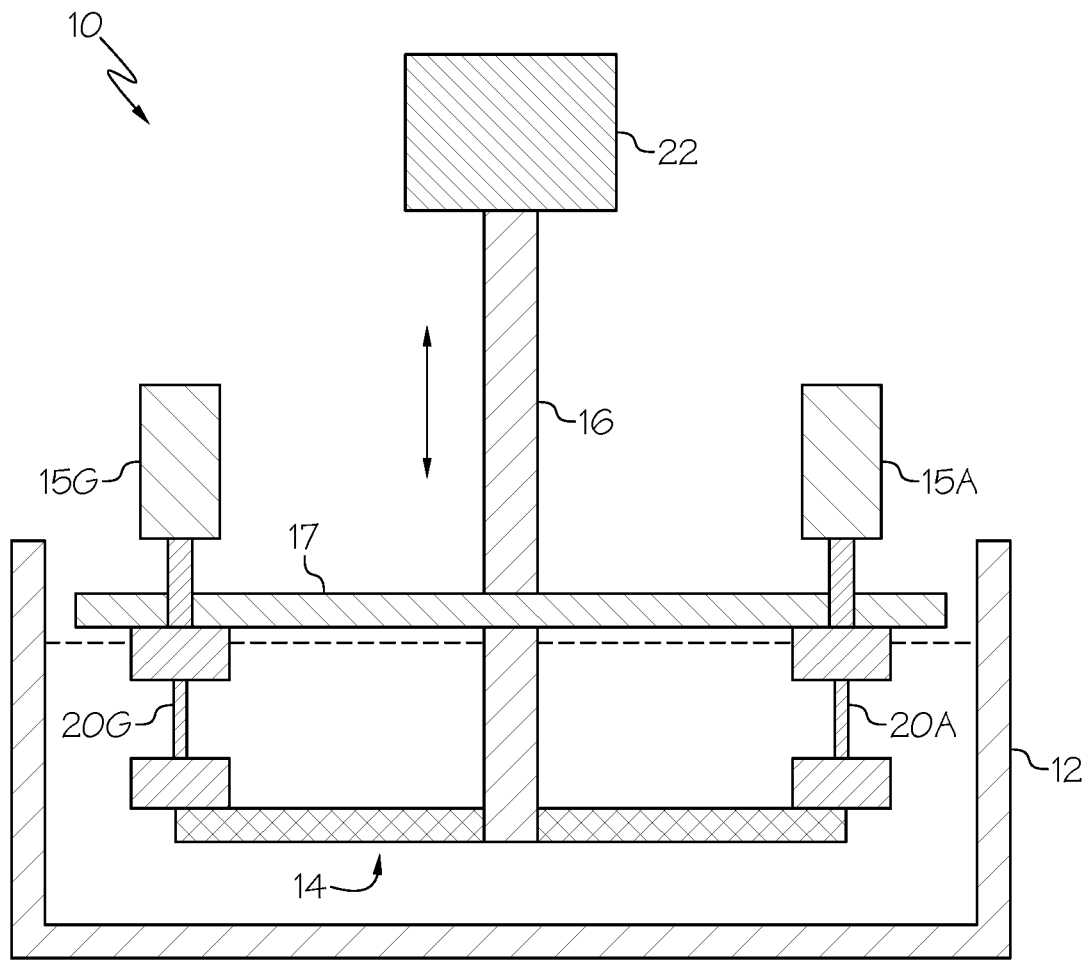
FIG. 1A is a simplified block diagram depicting a cross-section of a dynamic mechanical test instrument and FIG. 1B is a plan view showing the specimen zones for the MSF star of FIG. 1A.

FIG. 1A is a simplified block diagram depicting a cross-section of a dynamic mechanical test instrument 10 that can, for example, perform multi-specimen fatigue testing. The test instrument 10 may be used for conducting tension-tension, compression-compression or tension-compression tests to derive fatigue life curves and failure criteria for various devices and structure. By way of non-limiting examples, specimens that can be tested include stents, heart valves and their components, leads for implantable devices, textiles, fabrics, fabric strands and wire. For example, the test instrument 10 may provide tension or compression displacements of tens of millimeters and may cycle at rates up to a few hundred cycles per second.

The test instrument 10 includes an open-top box structure 12 which holds a temperature-controlled liquid in which the specimens are immersed during the testing period. The bath liquid may be a saline solution and may be temperature controlled. For example, the bath liquid may be maintained at a temperature of approximately 37° C. during testing. A multi-specimen fixture (MSF) system includes a moving component 14, a stationary component 17 and load cells 15. As used herein, "MSF star" refers to the moving component 14 of the MSF system and in particular to a generally "star-shaped" structure having radial extensions to which one end of each specimen is attached. The MSF star 14 includes 12 specimen zones 11A to 11L (generally 11), as shown in the plan view of FIG. 1B, where a specimen zone is defined as the space occupied by a specimen 20 attached to the MSF star 14. Generally, a specimen attachment location on the MSF star 14 is centered in the depicted specimen zone shown in FIG. 1B although this is not a requirement. Each specimen zone 11 is at the same radial distance from a central shaft 16 as the other eleven zones 11. The zones 11 are equally distributed in angle θ with respect to the shaft 16 such that neighboring zones 11 are separated in angle θ by 30°. One end of each specimen 20 is secured at the top side of the MSF star 14 near one end of a fixture arm 18A to 18L (generally 18) and is secured at an opposite end and coupled to a load cell 15 adjacent to a stationary component 17 above the MSF star 14 where an independent preload adjustment can be made to each specimen 20. The connectors used to secure the ends of the specimens 20 may be configured according to the specimens being tested and can include clamps, grips, vices and the like. Vertical preload adjustments may be made for some or all the specimens 20 to ensure a substantially equal preload for all specimens 20 prior to initiating a test. Each load cell 15 can be independently aligned for specimen position. The MSF star 14 may be formed near or at one end of the shaft 16 such that both parts together are a unitary structure. Alternatively, the MSF star 14 may be secured to the shaft 16 by a locking collar and/or a clamping device. The shaft 16 is coupled to a linear motor 22 which moves the MSF star 14 vertically to achieve the compression or tension displacements for each specimen 20. Each load cell 15 monitors the force applied at each specimen 20 and can identify the occurrence of a specimen failure.

During testing, the upper attachment point for each specimen 20 remains stationary while a cyclic vertical motion is imparted to the MSF star 14. The cyclic frequency can be maintained constant throughout the duration of the test or may be adjusted or otherwise programmed to change in a predetermined way throughout the test period. Similarly, the displacement amplitude can be adjusted or controlled either manually or in a programmed manner. Signals generated by the load cells 15 are typically monitored so that the load at each specimen 20 can be determined over time.

Multi-Specimen Test Device

Figure 2:
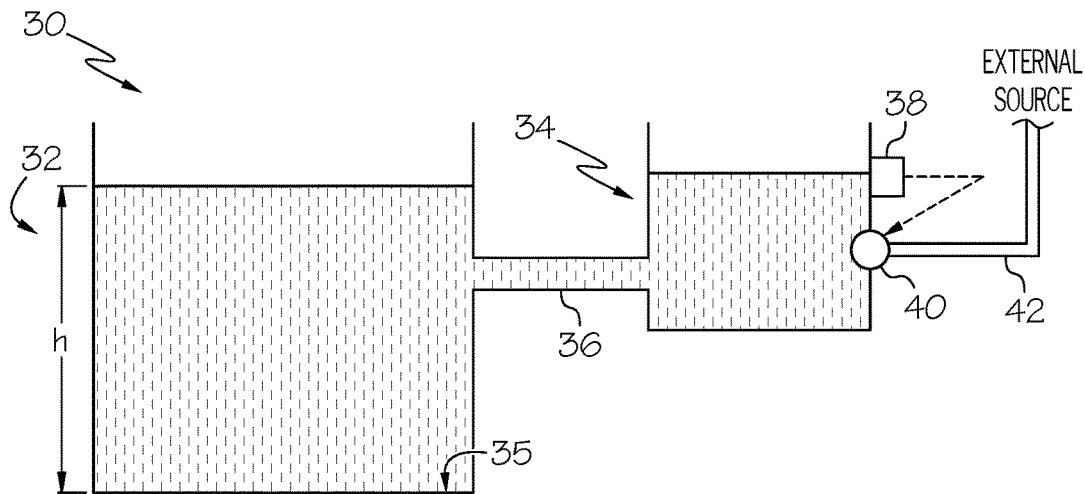
FIG. 2 is a block diagram depicting an example of a specimen chamber adapted to maintain a stable bath liquid level.

FIG. 2 is a block diagram depicting an example of a specimen chamber 30 adapted to maintain a stable liquid level for a bath for testing multiple specimens. The specimen chamber includes a bath chamber 32 and a supply reservoir 34. The bath chamber 32 may be similar to the open-top box structure 12 of FIGS. 1A and 1s configured to hold a first volume of a liquid. In some implementations, the bath chamber 32 receives one or more test items. For example, a MSF star having multiple test specimens may be immersed in the liquid to enable mechanical testing of the immersed specimens. In some alternative implementations, the test fixture may be different or the items under test may not be mounted to a fixture. The supply reservoir 34 holds a second volume of the liquid. A fluid channel 36 fluidically couples the bath chamber 32 and the supply reservoir 34. As a result, the liquid level in the supply reservoir 34 is the same as the liquid level in the bath chamber 32. "Liquid level," as used herein, means the height h of the upper surface of the liquid at the air-liquid interface relative to a reference surface such as the bottom surface 35 of the bath chamber 32. The fluid channel 36 is illustrated as a conduit (e.g., tubing) extending between the bath chamber and supply reservoir; however, in an alternative configuration, the fluid channel may be in the form of an opening through a single wall that separates the adjacent volumes of the bath chamber and supply reservoir such that no conduit is required. In some examples, multiple fluid channels are used to fluidically couple the bath chamber 32 and supply reservoir 34.

The specimen chamber 30 further includes a liquid level sensor 38 and a valve 40 to control the flow of liquid used to maintain a substantially constant liquid level. As illustrated, the liquid level sensor 38 is shown disposed on a wall of the supply reservoir 34; however, the liquid level sensor 38 may instead be disposed inside the supply reservoir 34 or in or on the bath chamber 32. The valve 40 is responsive to the liquid level, as sensed by the liquid level sensor 38, and is disposed on the supply reservoir 34 or in a fluid channel 42 that conducts liquid from a source of liquid to the supply reservoir 34. For example, the valve 40 may be mechanically or electrically controlled. The valve 40 opens to dispense a volume of the liquid from an external source of liquid into the supply reservoir 34 when the sensed liquid level decreases to a threshold level. For example, the threshold level may be a minimum acceptable liquid level in the bath chamber 32 that ensures the test specimens remain fully immersed in the bath liquid.

A variety of types of sensors may be used as the liquid level sensor 38, such as an optical sensor, an electromechanical sensor or an electrical sensor. By way of non-exclusive examples, the liquid level sensor 38 may utilize one or more of a float, a hydrostatic device, a load cell, a magnetic component, a capacitive component and an optical source. In some examples, the sensor provides a direct mechanical output (e.g., an analog change in position of a component through a mechanical linkage to a float) or an electrical signal having a voltage or current magnitude responsive to the liquid level. In one example, the electrical signal may be a logic signal (e.g., binary signal) that is in one state when the liquid level is greater than the threshold level and in an opposite state when the liquid level does not exceed the threshold level.

The valve 40 may be actuated by different actuation methods. For example, when the liquid level sensor 38 determines that the liquid level h has decreased to the threshold level, an actuation signal (e.g., electrical logic signal) can be provided to a pneumatic actuator or hydraulic actuator that opens the valve to allow liquid to pass into the supply reservoir 34. Alternatively, the actuation signal can be provided directly or in modified form (e.g., an amplified voltage or current signal) to enable an electrical actuator to open the valve 40. When sufficient liquid is dispensed into the supply reservoir 34 to increase the liquid level above the threshold level, the valve 40 is closed. In some examples, a preset volume of fluid is dispensed during a valve cycle. Preferably, the volume passed through the valve 40 is small enough (e.g., less than 1% of the nominal volume of liquid held in the supply reservoir 34) to ensure that the change in temperature of the liquid in the bath chamber 32 is negligible. In one example, the end of the fluid channel 36 at the bath chamber 32 is proximate to a heating surface to further reduce any variation in the temperature of the bath liquid. For example, one end of the fluid channel 36 may be in a side wall proximate to a heated base plate.

In one example, the liquid level sensor 38 and the valve 40 are provided as a single component in the form of a float valve. Preferably, all elements of the float valve are made from non-corrosive materials to improve the lifetime of the float valve, especially when used in certain liquids such as a saline solution where corrosion may be problematic.

Figure 3:
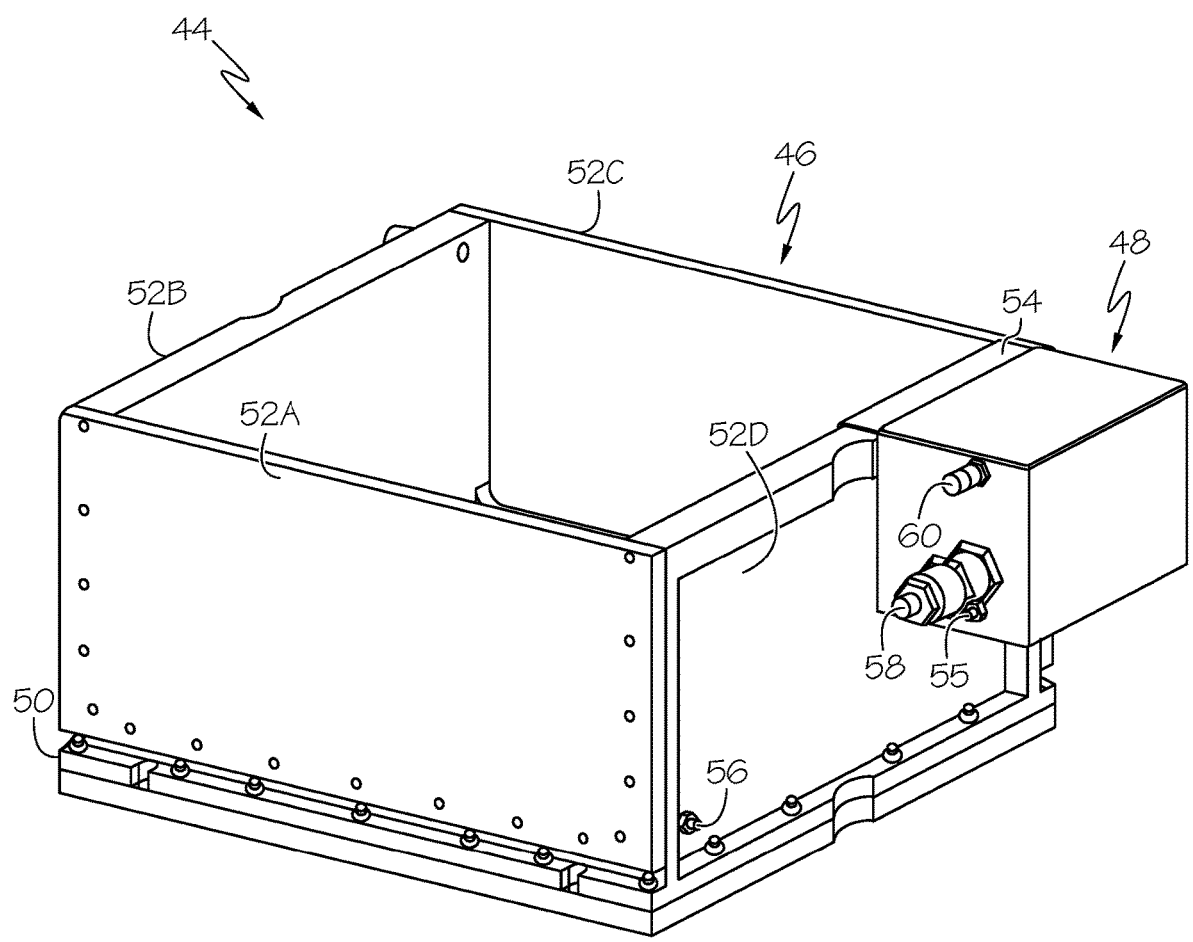
FIG. 3 is a perspective view of a specimen chamber for the dynamic mechanical test instrument.

FIG. 3 shows a view of a specimen chamber 44 for the dynamic mechanical test instrument. The specimen chamber 44 includes a bath chamber 46 configured to receive the MSF star with attached specimens. The bath chamber 46 holds a volume of a saline solution or other liquid in which the test specimens remain immersed during testing. The bath chamber 46 is sized to receive one or more items to be tested in the solution. For example, the bath chamber may be sized to receive a MSF star such that all specimens attached to the MSF star are fully immersed in the solution during testing. As illustrated, the bath chamber 46 includes a base 50 and four walls 52A to 52D (generally 52) that together define an open-top box into which the MSF star can be inserted. In other examples, the number and arrangement of walls defining the bath chamber can be different. The base 50 may include one or more heater elements to transfer heat to the bath liquid and to maintain the bath liquid at a desired temperature (e.g., 37° C.). Optionally, the top of the bath chamber 46 can be covered by a removable plate having an opening to pass the shaft that is coupled to the MSF star. Optionally, the walls 52 may be fabricated from a transparent material such as polycarbonate, glass or acrylic to enable the specimens to be observed during testing. For example, transparent walls fabricated from sheets or plates of an optical grade transparent material allow one or more cameras to observe and record images or video of specimens during the testing period. The walls 52 and base 50 can be attached to each other to form a leak-proof container, for example, by using an adhesive suitable for adhesion to the wall and base materials. Alternatively, or in combination, one or more flexible gaskets (e.g., O-rings) may be used to achieve a liquid-tight seal.

A supply reservoir 48 is used to hold an additional volume of the same type of liquid contained in the bath chamber 46. The supply chamber 48 is shown as a box structure attached to one of the walls 52D of the bath chamber 46 using an inverted hook extension 54; however, in other examples, the supply reservoir 48 can have a different shape, be attached to the bath chamber 46 by other means and be at a different location. Further, the supply reservoir 48 may be unattached and remote to the bath chamber 46. The supply reservoir 48 includes a port 55 for coupling the internal volume of liquid to the volume of liquid in the bath chamber 46 through a port 56 on a wall 52D of the bath chamber 46. The supply reservoir 48 includes a float valve port 58 and an overfill port 60. Tubing can be coupled to the overflow port 60 to drain liquid from the supply reservoir 48 in the event of accidental overfill. Optionally, a cover may be placed over the supply reservoir 48 to reduce or eliminate evaporation of liquid during operation; however, a cover is not a required component as the supply reservoir 48 automatically refills throughout the duration of the test as described below.

A float valve assembly is disposed inside the supply reservoir 48 and is coupled to the float valve port 58. The float valve port 58 is coupled to an external source of liquid, such as a saline bag or other liquid container.

Prior to initiation of a test, both the bath chamber 46 and the supply reservoir 48 are filled to a liquid level that equals or exceeds a threshold level that ensures the specimens are fully immersed in the liquid. As the liquid level inside the supply reservoir 48 decreases in conjunction with the liquid level in the bath chamber 46, the position of the float portion of the float valve assembly changes until the liquid level decreases to the threshold level. The float valve then opens and a volume of liquid from the external source is dispensed through the float valve port 58 into the supply reservoir 48, causing the liquid levels in both the supply reservoir 48 and bath chamber 46 to increase by a preset value. For example, the position of the float may be adjusted to obtain a desired change in the liquid levels. Subsequently, the float valve closes until the next time the float position reaches the position associated with the threshold level. This process repeats throughout the duration of testing to replenish the liquid in the bath chamber 46, maintaining the liquid level between the threshold level and a maximum fill level.

The float valve assembly is preferably configured for use in low pressure configurations. For example, the float valve assembly may be similar to those used in hydroponic applications. In one example, the float valve assembly is a Derick adjustable arm float valve model no. MA052 available from Control Devices, LLC in Fenton, Mo. In some instances, the metal portions of the float valve assembly are fabricated of stainless steel or other corrosive-resistant materials to resist corrosive liquids such as a saline solution. In other implementations, the supply reservoir may occupy some of the internal space of the bath chamber 46 if there is available space and if interference with the MSF star and specimens can be avoided.

In the examples of a specimen chamber, as described above, the liquid in a bath chamber is automatically replenished in a nearly undetectable manner with minimal or no impact on the temperature of the bath liquid because the volume rate at which the liquid is replenished is low. Although described herein for use with an MSF star, it should be recognized that the bath chamber can be used for other baths in which a substantially constant bath liquid level is desired. The supply reservoir 48 and associated components can be coupled to an existing bath chamber 46 without significant effort and eliminate the need for test personnel to repeatably address replenishment of liquid during a test.

Multi-Specimen Test Fixture

Figure 4:
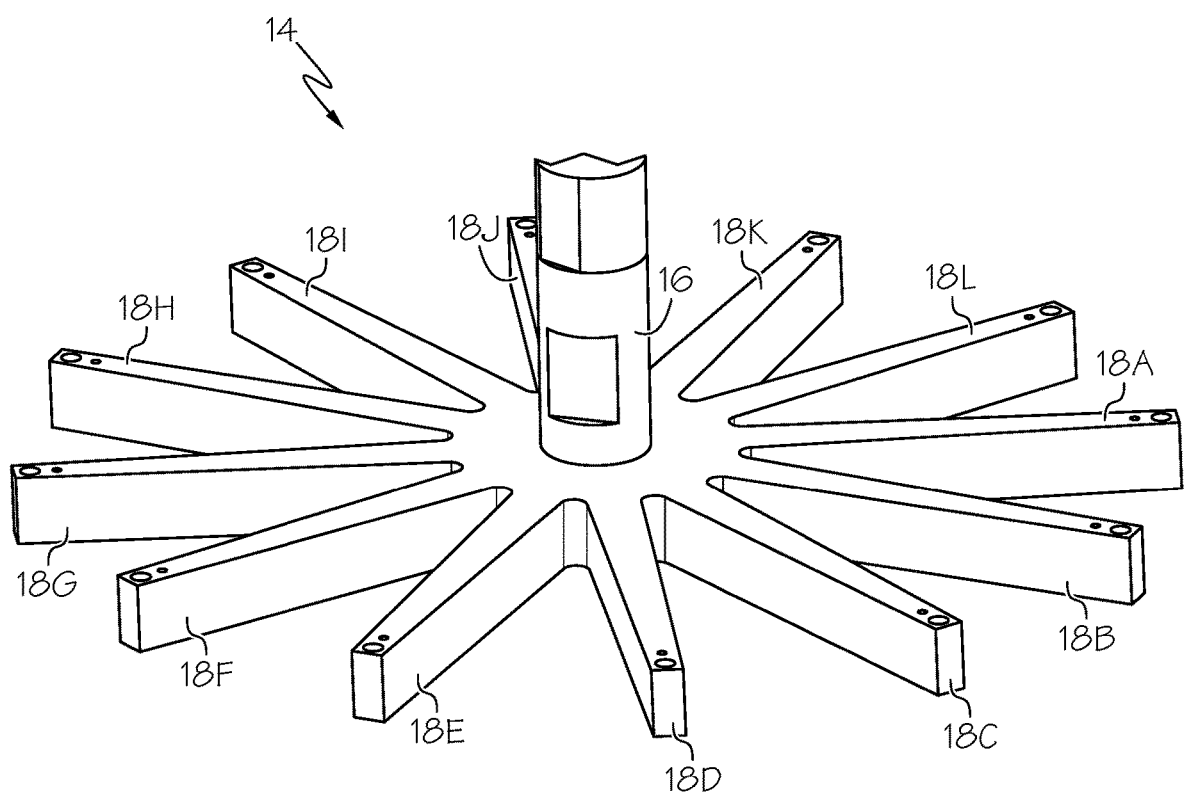
FIG. 4 shows a MSF star and shaft for a MSF system used to hold 12 specimens during testing with the dynamic mechanical test instrument.

FIG. 4 is an illustration of a MSF star 14 and shaft 16 for a MSF system used to hold 12 specimens during mechanical testing. Each fixture arm 18A to 18L (generally 18) of the MSF star 14 extends from an axial fixture opening where the MSF star 14 is coupled to a central shaft 16. In some alternative implementations, a fixture hub is disposed at the axial fixture opening and used to couple the MSF star 14 to the shaft 16.

Each specimen to be tested is attached proximate to the end of each fixture arm 18 at a specimen attachment location. Referring again to FIG. 1A, one end of each specimen 20 is attached to the top side of a respective fixture arm 18 and the other end of the specimen 20 is attached to a load cell 15. Pre-load adjustment components used to achieve equal pre-loads before a test and the load cells 15 used to monitor the specimens during testing are provided at the stationary plate 17. During testing, the reciprocating vertical motion of the shaft 16 induces a reciprocating vertical motion of the MSF star 14 so that each specimen undergoes cyclic loading.

As described above, the bath chamber provides the local environment for the MSF star 14 and attached specimens 20 which are limited in size by the dimensions of the bath chamber 12. Referring again to FIG. 1B, the specimen zones 11 are equally distributed along a circle that is centered on the axis of the shaft 16. In some conventional applications, the circular array configuration is limited to a maximum of 12 specimens based on the specimen size and the dimensions of the bath chamber 12. To accommodate additional specimens, a larger bath chamber is required. Moreover, if larger specimens are to be tested without changing the size of the bath chamber, the MSF star may be required to have fewer fixture arms with greater spacing between the fixture arms.

Some test protocols require testing a minimum number of specimens. For example, if 30 specimens are required to be tested and each MSF star 14 holds 12 specimens, then three test instruments are required to operate in parallel to complete testing in the minimum time. The cost of a test instrument may be prohibitively high. In such situations, fewer test instruments may be used to perform the required testing; however, the total time required to test all specimens is significantly increased as sequential test periods are required. For example, if only one test instrument is available and is limited to testing 12 specimens, the time necessary to complete testing of 30 specimens is three times that of a single test duration for the test instrument. Such delays in completing testing can be detrimental to product development, especially when the time required for a test instrument to complete mechanical testing of a set of specimens may be weeks.

Figure 5:
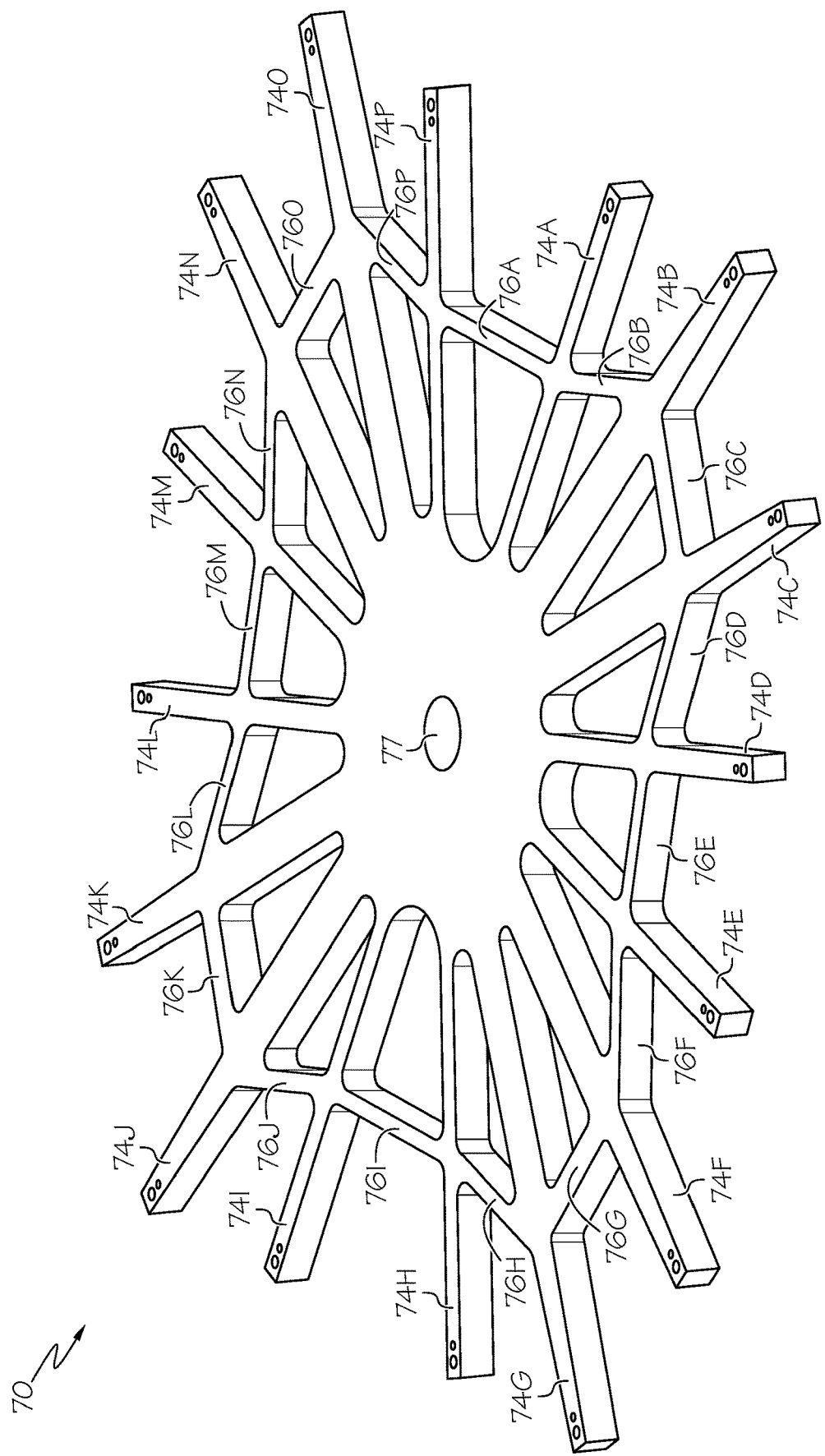
FIG. 5 is a perspective view of an example of a MSF star that holds specimens in a square array configuration.
Figure 6:
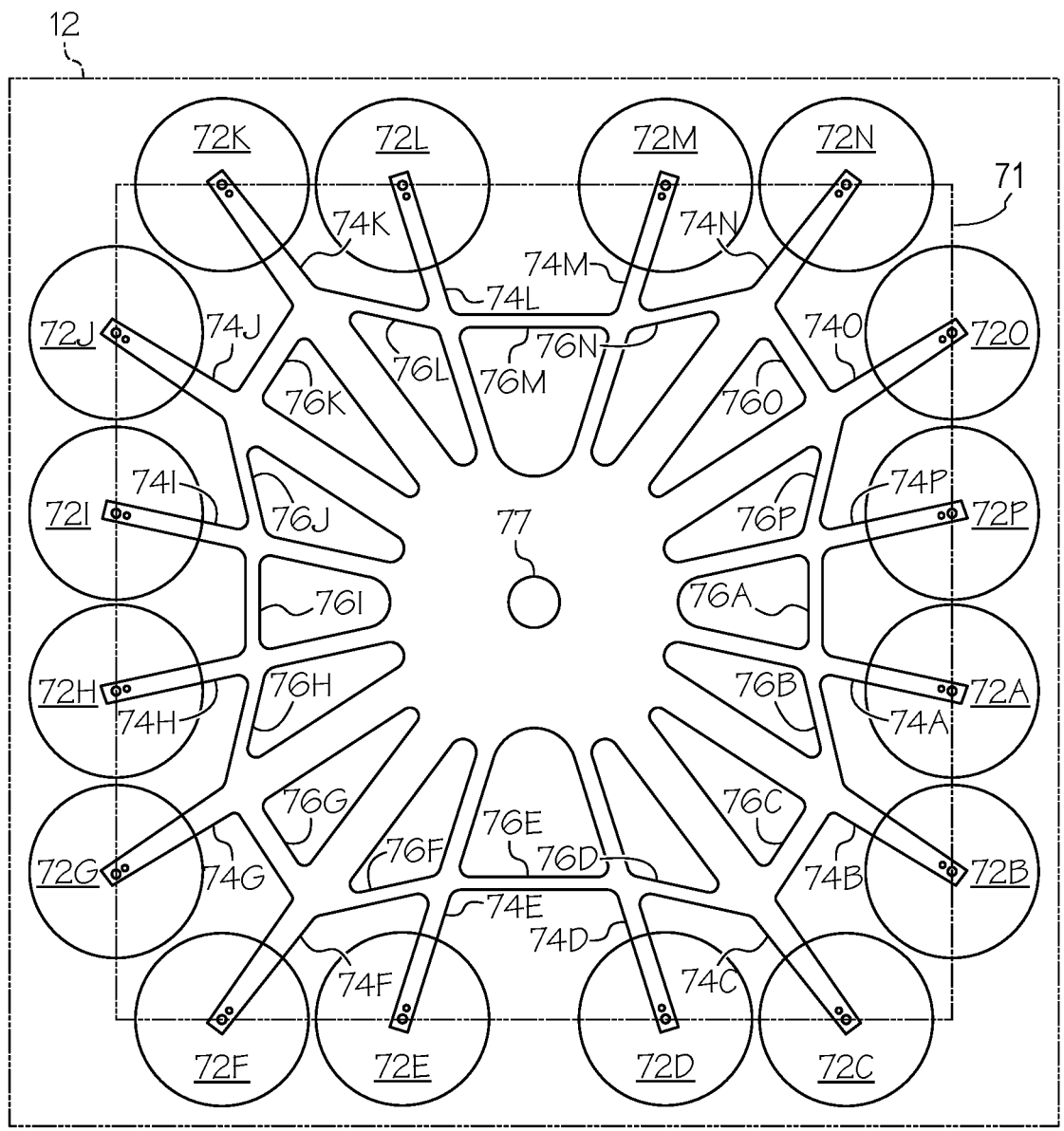
FIG. 6 shows a plan view of the MSF star of FIG. 5 inside the same bath chamber box shown in FIG. 1B.

FIG. 5 is a perspective view of an example of an MSF star 70 that holds 16 specimens in a square array (see square array 71 in FIG. 6) and which provides advantages over a conventional circular configuration 12 specimen MSF star. FIG. 6 shows a simplified plan view of the 16 specimen MSF star 70 inside the same size bath chamber box shown in FIG. 1B. Each specimen zone 72 is equal to or larger than the specimen zones 11 for the 12 specimen MSF star. The MSF star 70 includes 16 fixture arms 74 and 16 cross-members 76. Each fixture arm 74 extends radially from a fixture center and has a specimen zone 72 proximate to the arm end. Each cross-member 76 is in the form of a strut and has one end at a fixture arm 74 at a position between the fixture center and the arm end. Each cross-member 76 further includes an opposite end at an adjacent fixture arm 74 at a position between the fixture center and the arm end. The fixture arms 74 and cross-members 76 may be formed as a unitary object wherein the intervening open sections and other geometrical features are generated in a machining process. Alternatively, the MSF star 70 may be cast to its approximate shape and further processed with reduced machining requirements or generated using an additive manufacturing process. When a load is applied by a shaft that is coupled to the MSF star 70 at the axial fixture opening 77, the load is equally distributed to the specimen zones 72 despite the lack of radial symmetry.

The gaps shown along the square perimeter between specimen zones 72A and 72P and specimen zones 72G and 72H are provided so that vertical posts supporting the upper portion of the test instrument do not significantly obscure any of the specimens during testing.

The geometry of the square MSF star 70 is selected so that the deflection at each specimen attachment location within its specimen zone 72 is substantially identical. For example, a variation in the deflection at each specimen attachment location within approximately 0.025 mm (0.001 inch) means that the deflections are substantial identical or substantially equal. The thickness of the fixture arms 74 may differ. For example, longer fixture arms 74 may have a different thickness than shorter fixture arms 74. In addition, the locations of the cross-members 76 are selected to achieve a substantially identical distribution of the load applied by the shaft. For example, the distance from a location where the cross-members 76 terminate at a fixture arm 74 to the end of that fixture arm 74 may be substantially identical (e.g., within +0.003 in.) for all the fixture arms 74 as this is the region over which most of the deflection occurs.

In some examples, the fixture arms 74 have a cross-sectional shape such as a rectangle, square, triangular, round or oval shape, or an "I", "L" or "T" shape" selected to achieve a displacement at the specimen attachment location that is substantially equal to the displacement at each of the other specimen attachment locations. The fixture arms 74 may also be hollow (e.g., a tube). The cross-sectional shape may differ for different fixture arms 74 and different cross-members 76. Similarly, the cross-sectional shape of each cross-member may be selected to achieve substantially equal displacements at all the specimen attachment locations. In some implementations, such as illustrated in the figure, the geometrical characteristics (e.g., width, length and thickness) of diametrically-opposed fixture arms (e.g., fixture arms 74A and 74I) are identical. Similarly, the geometrical characteristics of diametrically-opposed cross-members (e.g., 76A and 76I) may be identical.

The MSF star 70 can be made from a variety of materials including, by non-exclusive examples, stainless steel, titanium and non-corrosive metals, and ceramics, composite materials and plastics. The openings defined within the MSF star 70 between the fixture arms 74 and cross-members 76 make the MSF star 70 lighter and reduce the disturbance to the bath solution as the MSF star 70 moves vertically during testing. Reduced weight is desirable to avoid limitations on the size of the linear motor used to drive the shaft and the number of specimens that may be accommodated.

Although a limited number of structural feature modifications are described above for achieving substantially equal deflections at the specimen attachment locations, other feature parameters may be modified for this purpose. A non-exclusive listing of such feature parameters includes the length, width, angle, height and width bias of the outer portion of the fixture arms 74, the length, width, thickness, width bias thickness bias and web thickness of the inner portion of the fixture arms, and the width, height, thickness, thickness bias and web thickness of the cross-members.

While the 16 specimen MSF star 70 described above holds the specimens in a square array 71 centered on the fixture center, it should be recognized that in alternative examples of an MSF star the specimens may be held in a rectangular array that is not a square array. Such a configuration is desirable, for example, for a rectangular (non-square) bath chamber. Although the illustrated MSF star 70 can be used to test 16 specimens, in other examples the MSF star is attached to a different number of specimens, including even or odd numbers of specimens. Preferably, the MSF star exhibits quadrant symmetry for reduced complexity; however, this is not a requirement.

In other implementations, a MSF star can include additional specimen zones disposed inside the rectangular array of zones described above. Such configurations include additional specimen zones along the fixture arms at positions that are closer to the axial fixture opening such that specimens at all the specimen zones experience a substantially equal load applied by the central shaft. In one example, the additional zones define a smaller rectangular array than the rectangular array defined by the other attachment zones.

Figure 1B:
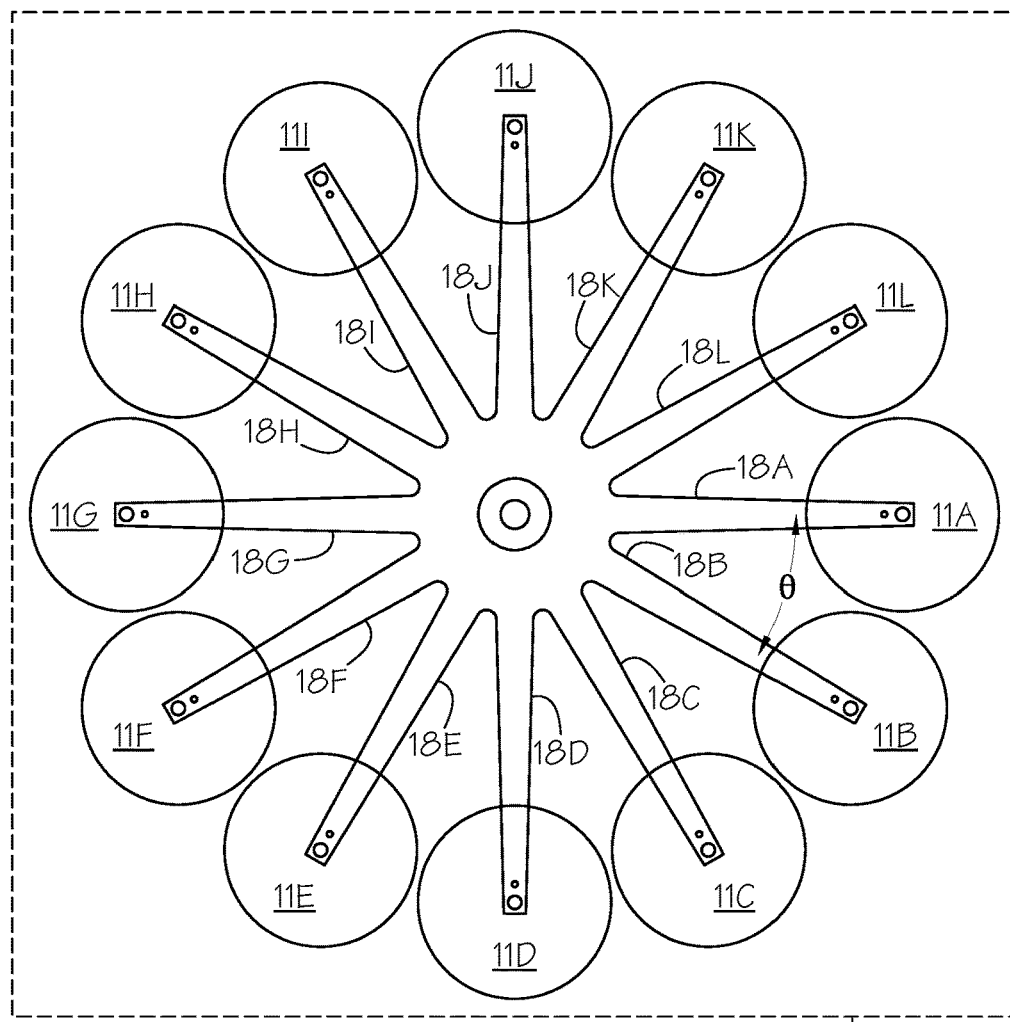

In a test instrument such as that shown in FIGS. 1A and 1B, the available vertical test space for a specimen is a fixed value and is determined according to the length of the central shaft 16 that couples the MSF star 14 to the linear motor 22. A shaft of a certain length may be replaced by a shaft having a different length to obtain a different vertical test space. For example, one shaft may provide a 50 mm test space while a longer shaft may provide a 100 mm test space. Replacing one shaft with another shaft to achieve a different test space typically involves a realignment of components (e.g., load cells) relative to the MSF star 14. This realignment may take several hours to several days for test personnel to perform. Realignment may be necessary, in part, due to the loss of the angular orientation (i.e., "clocking) position of the MSF star 14 relative to the axis of the shaft 16.

Figure 7:
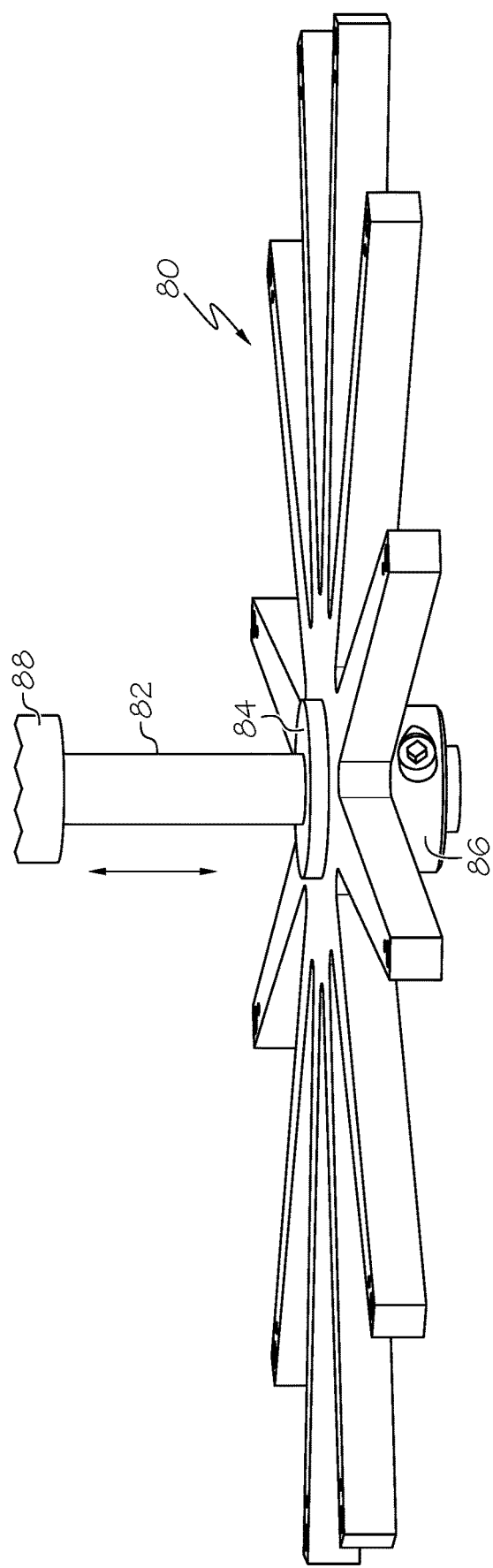
FIG. 7 shows a MSF star attached to a central axis using a locking collar and clamp.

FIG. 7 shows a MSF star 80 attached to a central shaft 82 in the axial opening of the MSF star using a locking collar 84 and clamp 86. The shaft 82 extends from a linear motor (not shown) used to impart vertical motion to the MSF star 80. A coupler 88 at the upper end of the shaft 82 is used to mechanically couple the MSF star 80 to the linear motor.

The MSF star 80 is shown in the figure at a lower vertical position on the shaft 82 to accommodate a larger vertical specimen test space due to its greater distance from the upper attachment points and load cells (not shown). The shaft 82 can be used without the need for replacement when a different vertical test space is required. The MSF star 80 can be adjusted to any vertical position between a minimum and maximum vertical position and secured at the desired vertical position by the clamp 86. As illustrated, the clamp 86 is a split shaft clamp; however, other types of clamps may be used to secure the MSF star 80 at the desired vertical position. For example, the MSF star 80 can be positioned higher on the shaft 82 for specimens utilizing a smaller vertical specimen test space. The shaft 82 includes one or more keyways to receive a key member that extends inwardly from the locking collar 84. The keyway can be in the form of a slot, spline or other feature formed in the cylindrical surface of the shaft 82 and does not extend around the full circumference of the shaft 82. The length of the keyway is parallel to the axis of the shaft 82. The keyway engages a key member extending from the locking collar 84 or MSF star 80 to prevent a loss of rotational alignment of the MSF star 80 relative to the shaft axis during vertical adjustments of the MSF star 80. In non-exclusive examples, the keyway may be a V-shaped slot or a slot having a rectangular cross-section. The key member may be a set screw or another component that extends from the MSF star 80 or locking collar 84 into the keyway. In one preferred implementation, the key member is a spring-loaded member, and, in another preferred implementation, the key member includes a spherical surface that engages one or more surfaces of the keyway.

Figure 8A:
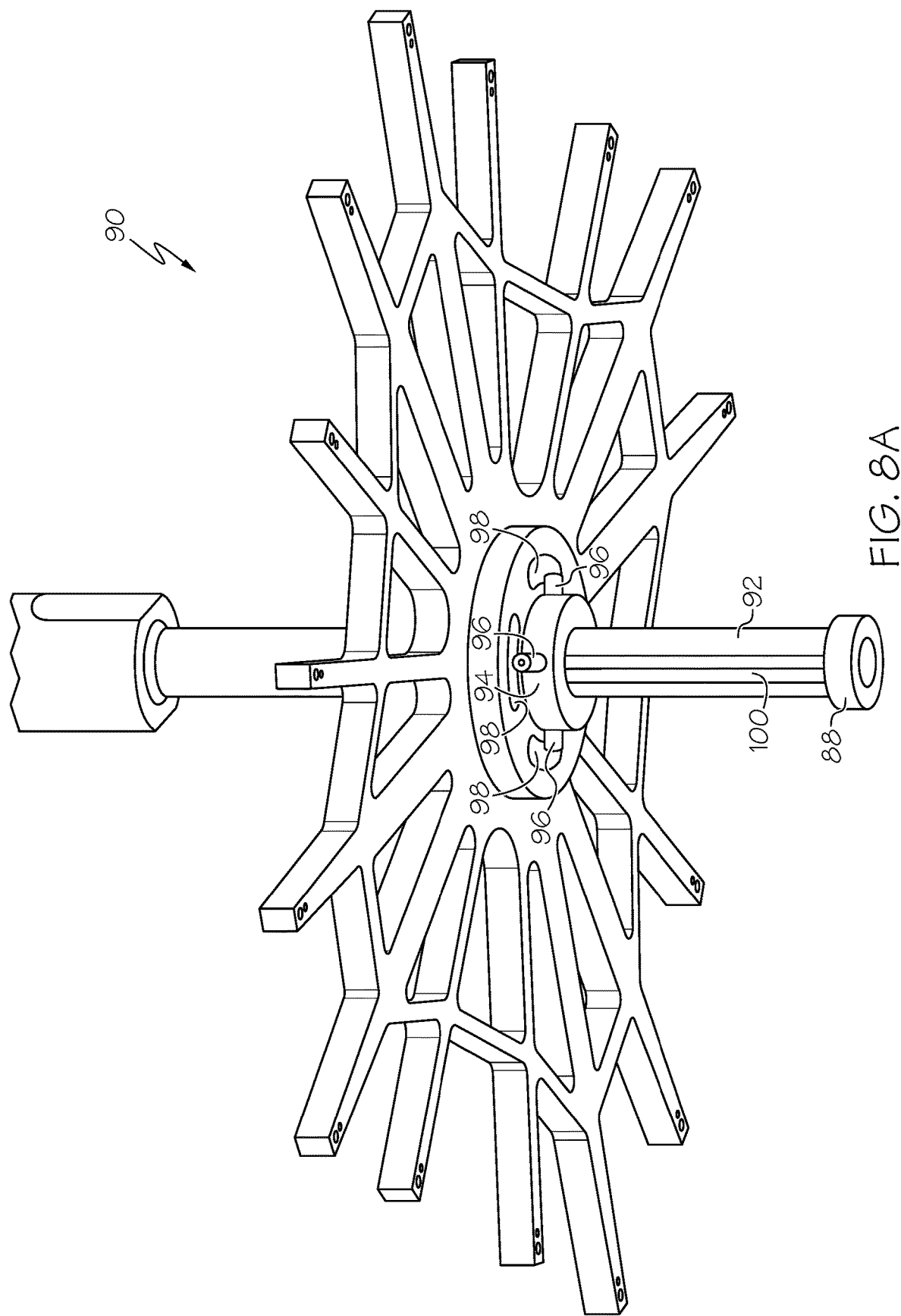
FIGS. 8A and 8B are a bottom-side perspective view and a cross-sectional view, respectively, of an example of a MSF star attached to a shaft having multiple keyways.
Figure 8B:
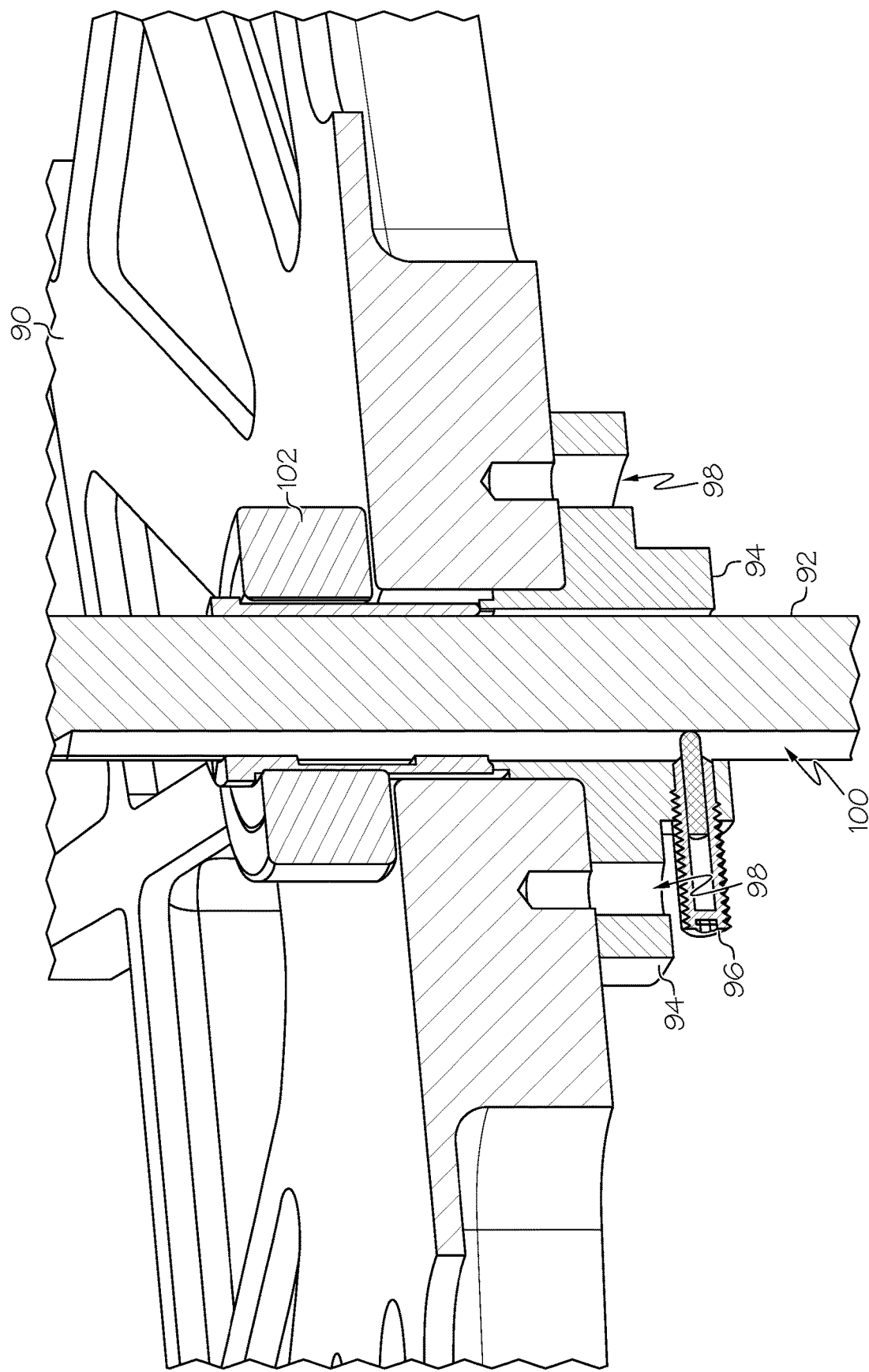

FIG. 8A and FIG. 8B show a bottom-side perspective view and a cross-sectional view, respectively, of one example of a MSF star 90 attached to a central shaft 92. The locking collar 94 includes three threaded openings that each receive a spring-loaded ball set screw 96. FIG. 8B shows threaded openings 98 in the locking collar 94 that receive screws or bolts to secure the locking collar 94 to the MSF star 90. Also shown in FIG. 8B is one of the ball screws 96 driven inward into the one of three keyways 100 in the shaft 92 to lock the MSF star 90 into rotational position. During vertical adjustment of the MSF star 90 to accommodate a different size specimen or test space, the clamp 102 is loosened so that an operator can manually slide the MSF star 90 upward or downward to a different vertical position. The three ball screws 96 and respective keyways 100 prevent rotation of the MSF 90 about the shaft axis during a change in the vertical position. Once the MSF star 90 is in the desired vertical position, the clamp 102 is tightened.

In other implementations, fewer or greater numbers of key members can be used. In another alternative implementation, the locking collar is integrally formed with the MSF star as a single unitary structure. In another alternative, the locking collar and clamp may be formed as a single unitary component.

While the invention has been shown and described with reference to specific embodiments, it should be understood by those skilled in the art that various changes in form and detail may be made therein without departing from the scope of the invention as recited in the accompanying claims.

What is claimed is:

1. A multi-specimen test fixture star comprising:
   a plurality of fixture arms each extending radially from a fixture center and having an arm end with a specimen attachment location; and
   a plurality of cross-members, each cross-member having a first end at a fixture arm at a position between the fixture center and the arm end and each cross-member having a second end at an adjacent one of the fixture arms at a position between the fixture center and the arm end,
   wherein a load applied by a shaft coupled to the fixture arms at the fixture center is equally distributed to the specimen attachment locations and wherein the specimen attachment locations define a rectangular array centered on the fixture center.

2. The multi-specimen test fixture star of claim 1 wherein the fixture arms extend radially from an axial fixture opening at the fixture center and wherein the multi-specimen test fixture star further comprises a fixture hub disposed at the axial opening and configured for coupling the multi-specimen test fixture star to the shaft.

3. The multi-specimen test fixture star of claim 1 wherein, for each of the fixture arms, a cross-section of the fixture arm is selected to achieve a displacement at the specimen attachment location that is substantially equal to the displacement at each of the other specimen attachment locations.

4. The multi-specimen test fixture star of claim 1, wherein, for each of the cross-members, a cross-section of the cross-member is selected to achieve a displacement at the specimen attachment location that is substantially equal to the displacement at each of the other specimen attachment locations.

5. The multi-specimen test fixture star of claim 3 wherein at least one of a width, a length and a thickness of at least one fixture arm is different than at least one of the width, the length and the thickness of at least one other fixture arm.

6. The multi-specimen test fixture star of claim 4 wherein at least one of a width, a length and a thickness of at least one cross-member is different than at least one of the width, the length and the thickness of at least one other cross-member.

7. The multi-specimen test fixture star of claim 1 wherein a width, a length and a thickness of each fixture arm is the same as the width, the length and the thickness of a diametrically-opposed fixture arm.

8. The multi-specimen test fixture star of claim 1 wherein a width, a length and a thickness of each cross-member is the same as the width, the length and the thickness of a diametrically-opposed cross-member.

9. The multi-specimen test fixture star of claim 1 wherein the rectangular array is a square array.

10. The multi-specimen test fixture star of claim 1 wherein the specimen attachment locations are first specimen attachment locations, wherein the multi-specimen test fixture star further comprises a plurality of second specimen attachment locations each disposed along a length of one of the fixture arms between the arm end and the fixture hub and wherein the load applied by the central shaft is equally distributed to the first and second specimen attachment locations.

11. The multi-specimen test fixture star of claim 10 wherein the second specimen attachment locations define a rectangular array centered on the fixture center.

* * * * *